(12) United States Patent
Clarke

(10) Patent No.: US 8,293,830 B2
(45) Date of Patent: Oct. 23, 2012

(54) SILICONE RESIN COMPOSITES FOR HIGH TEMPERATURE DURABLE ELASTIC COMPOSITE APPLICATIONS AND METHODS FOR FABRICATING SAME

(75) Inventor: William A Clarke, Merced, CA (US)

(73) Assignee: Flexible Ceramics, Inc., Palm Springs, CA (US)

( * ) Notice: Subject to any disclaimer, the term of this patent is extended or adjusted under 35 U.S.C. 154(b) by 226 days.

(21) Appl. No.: 12/665,715

(22) PCT Filed: Jun. 19, 2008

(86) PCT No.: PCT/US2008/007667
§ 371 (c)(1),
(2), (4) Date: Dec. 19, 2009

(87) PCT Pub. No.: WO2008/156821
PCT Pub. Date: Dec. 24, 2008

(65) Prior Publication Data
US 2010/0324187 A1    Dec. 23, 2010

Related U.S. Application Data

(60) Provisional application No. 60/936,472, filed on Jun. 19, 2007.

(51) Int. Cl.
*C08K 3/38* (2006.01)
(52) U.S. Cl. ........ 524/405; 524/492; 524/404; 524/430; 524/413; 524/443; 524/448; 524/406; 524/456; 427/554
(58) Field of Classification Search .................. 524/405
See application file for complete search history.

(56) References Cited

U.S. PATENT DOCUMENTS 6,183,873 B1 * 2/2001 Clarke ......................... 428/447

OTHER PUBLICATIONS

Clarke, Azzazy and West, Reinventing the Internal Combustion Engine, SAE Paper, 2002-01-0332, Mar. 4, 2002.*

* cited by examiner

*Primary Examiner* — Doris Lee
(74) *Attorney, Agent, or Firm* — Robert R. Meade

(57) ABSTRACT

This invention relates to composites for use in high temperature elastic composite applications. Most particularly, this invention relates to elastic composites formed with a silanol-silanol condensation reaction mixture of silsesquioxane silicone resins thermally stabilized by boron nitride, silica and boron oxide additives as their matrix. The polymer matrix composite comprise a matrix of cured high, intermediate and optionally low molecular weight silicone resins including boron nitride and silica additives and reinforcing material.

32 Claims, 5 Drawing Sheets

Thermogravimetric Scan of Typical Glass Fiber Filled Polysiloxane
Laminate Revealing an 88 wt. % yield.

S-glass fabric reinforced polysiloxane laminate post cure porosity.

000

SILICONE RESIN COMPOSITES FOR HIGH TEMPERATURE DURABLE ELASTIC COMPOSITE APPLICATIONS AND METHODS FOR FABRICATING SAME

RELATED APPLICATIONS DATA

The present application claims benefit from commonly owned, United States Application for Provisional Patent, Application No. 60/936,472, filed Jun. 19, 2007. The present application is related to commonly owned co-pending applications, "Red Heat" Exhaust System Silicone Composite o-Ring Gaskets and Method for Fabricating Same, application Ser. No. 12/665,716, and Internal Combustion (IC) Engine Head Assembly Combustion Chamber Multiple Spark Ignition (MSI) Fuel Savings Device and Methods of Fabrication Thereof, application Ser. No. 12/665,717, each filed on even day herewith.

BACKGROUND OF THE DISCOVERY

1. Field of the Discovery

This invention relates to composites for use in high temperature elastic composite applications. Most particularly, this invention relates to elastic composites formed with a silanol-silanol condensation reaction mixture of silsesquioxane silicone resins thermally stabilized by boron nitride, silica and boron oxide additives as their matrix. When the composites are heat cured from 200 to 1000° C. the % recovery from 15% compression fatigue cycle testing for 10,000,000 cycles drops off with increasing cure temperature as shown in FIG. 1. Additionally, when these same porous composites are vacuum impregnated with the resin blend; they endure the same 10,000,000 fatigue cycles with greater than 95% recovery also shown in FIG. 1. The composites have endured over 4 years internal combustion (IC) engine pressurized severe exhaust manifold temperatures without seal leakage or burn through from exhaust gas at sustained and spike temperatures approaching 1000° C. The composites have passed FAA fire penetration, burn through, heat release (<10 kW/m$^2$), smoke density and Boeing toxicity testing per BSS 7239.

2. Description of the Previously Published Art

The Beckley patent, U.S. Pat. No. 5,552,466 is specific to teach methods of producing processable resin blends that produce high density silica ceramics in the red heat zone. The preferred catalyst, zinc hexanoic acid produces a high cross-link density polymer by the Beckley methods of processing that favor the formation of high yield ceramic composites compared the high temperature elastic silicone polymers produced by the Clarke methods of using boron nitride, silica and a preferred boron oxide catalyst. No mention is made of compression-recovery properties common to Clarke related composites.

The Boisvert, et al. patent, U.S. Pat. No. 5,972,512 is specific to teach silanol-silanol condensation cured methylsilsesquioxane resins enabling the fabrication of non-burning composites with superior performance than organic laminates. No mention is made of producing a high temperature elastic silicone containing boron nitride and silica to produce the fire resistant elastic silicone laminate that slowly transforms into a flexible ceramic then ceramic with no burn through at 2000° F. after 15 minutes. Also, the fire resistance is specific to methyl resins overlooking the high thermal advantages of phenyl resins even when used sparingly. Also, elastic composites have dissimilar materials joining advantages not mentioned in the Boisvert patent.

The Clarke patent, U.S. Pat. No. 6,093,763 is specific to teach the use of the zinc hexanoic acid catalyst for a specific ratio of 2:1 for two specific silicon resins with boron nitride as filler. The zinc hexanoic acid catalyst produces a different high cross-link density polymer than the preferred elastic composite produced from a reaction mixture of boron nitride, silica and boron oxide and controlled reaction methods. The amount of zinc catalyst required to enable the sealant to perform is also excessive in comparison to the boron oxide catalyst which is sparingly used to favor a slow reaction for producing elastic composites.

The Clarke patent, U.S. Pat. No. 6,161,520 is specific to teach that the gasket materials derived from Clarke's copending U.S. patent application Ser. Nos. 08/962,782; 08/962,783 and 09/185,282, all teach the required use of boron nitride as the catalyst for condensation polymerization of the resin blend needed to produce the gaskets. Clarke has verified that boron nitride is not a catalyst as incorrectly claimed. Clarke verified the certainty that boron nitride is not a catalyst by attempting to repeat the 873 patent's FIG. 1 "gel" curve at 177° C. using the preferred CERAC, Inc. item #B-1084—99.5% pure boron nitride. Other research associates have also confirmed the certainty that boron nitride is not a silicone condensation catalyst. Numerous possible contaminates would need to be investigated to find the actual catalyst or combination of catalysts including the possibility of humidity. No mention of using boron nitride, silica and boron oxide as a reaction mixture processed in a rotating cylinder at ambient temperature to favor the production of a high temperature elastic composite. Neither is boron oxide mentioned as catalyst with boron nitride cost advantage addressed when boron oxide is used as a residual from the chemical processing (Reference 1) of boron nitride.

The Clarke patent, U.S. Pat. No. 6,183,873 B1 is specific to teach the use of boron nitride as the catalyst in producing polysiloxane resin formulations for hot melt or wet impregnation of ceramic reinforcements. As stated above, boron nitride is not a catalyst as incorrectly claimed. The more costly and toxic hot melt and wet processing methods of the above described '873 patent are eliminated with the superior ambient temperature methods addressed by the inventor. No resin formulations using boron oxide as the catalyst (Table 6) are mentioned. Additionally, the methods of producing "flexible ceramic" high temperature elastic laminates are not addressed. Also, the use of laser processing (up to 16,500° C.) to increase the tensile strength by 25% and form ceramic sealed edges is not addressed. The economical advantage of using residual boron oxide contained in boron nitride as a source for the catalyst addition is not mentioned.

The Clarke SAE 2002-01-0332 paper (Reference 2) refers to high purity boron oxide as a Lewis acid catalyst with silica mentioned as an unobvious inhibitor for these silicone condensation polymerization catalysts. High cost boron nitride and boron oxide are added separately. No mention is made of producing resin formulations using boron nitride containing boron oxide residues as a source of boron oxide catalyst and cost savings advantage. Additionally, the methods of producing "flexible-ceramic" laminates capable of high-temperature elastic recovery (FIG. 1) are not addressed. Also, the use of laser processing (up to 16,500° C.) to increase the tensile strength by up to 25% and forming ceramic sealed edges is not addressed. The "self extinguishing" property of the elastic composite when heat is removed is also not mentioned. This is an essential requirement to prevent combustion pre-ignition in superior fuel saving flexible ceramic composite ignition devices.

REFERENCES CITED

U.S. Patent Documents

| | | |
|---|---|---|
| 5,552,466 | Sep. 3, 1996 | Beckley et al. |
| 5,972,512 | Oct. 26, 1999 | Boisvert et al. |
| 6,093,763 | Jul. 25, 2000 | Clarke |
| 6,161,520 | Dec. 19, 2000 | Clarke |
| 6,183,873 | Feb. 6, 2001 | Clarke |

Published References
1. Lenonis, D. A.; Tereshko, J. and C. M. Andersen, *Boron Nitride Powder—A High-Performance Alternative for Solid Lubrication*, Advanced Ceramics Corporation, A Sterling Publication (1994).
2. Clarke, W. A.; Azzazy, M and West, R., *Reinventing the Internal Combustion Engine Head and Exhaust Gaskets*, Clarke & Associates, *SAE PAPER*, 2002-01-0332, (Mar. 4, 2002) pp. 2-3.
3. Thompson, Raymond, *The Chemistry of Metal Borides and Related Compounds*, reprinted from *PROGRESS IN BORON CHEMISTRY*, Vol. 2, Pergamon Press, (1969) p. 200.
4. Thompson, ibid. pp 212-213.
5. Sorenson W. R. and W. T. Campbell, *Preparative Methods of Polymer Chemistry*, John Wiley & Sons, (1968) p. 387.
6. Rochow, E. G., *Chemistry of the Silicones*, Second Edition, Wiley, (1951).
7. Thompson, ibid. p. 217.

SUMMARY OF THE DISCOVERY

Objectives of the Discovery

The inventor has evaluated (Reference 2) ceramic oxide catalysts (see Table 1) and found boron and aluminum oxide to be Lewis acid catalysts for ambient temperature activating silicone reactions with the unexpected inhibiting capability of submicron silica. Also, boron oxide is a common contaminant of boron nitride commercial production requiring costly leaching stages to remove it. Because of this significant cost savings advantage, it is the objective of this discovery to exploit the use of lower cost boron nitride containing residual boron oxide for catalyzing the resin reaction mixtures.

TABLE 1

Silicone Resin "Gel" Times Taken at 177° C.
When Catalyzed By $B_2O_3$ or $Al_2O_3$ and Inhibited by $SiO_2$.
Parts by Weight

| Silicone Resin | $B_2O_3$ | $Al_2O_3$ | $SiO_2$ | Gel Time @ 177° C. Minutes |
|---|---|---|---|---|
| 100 | 0.25 | — | — | 2.5 |
| 100 | 0.10 | — | — | 4.5 |
| 100 | 0.25 | 0 | 5 | 4.5 |
| 100 | 0.25 | 0 | 10 | 9.5 |
| 100 | 0 | 0.10 | 0 | 2.0 |
| 100 | 0 | 0.05 | 0 | 4.5 |
| 100 | 0 | 0.50 | 5 | 7.0 |
| 100 | 0 | 1.00 | 10 | 7.0 |

Both $B_2O_3$ and $Al_2O_3$ behave as Lewis Acids in facilitating the condensation reaction of the selected silicone resin formulation. The $Al_2O_3$ is twice as effective on a weight basis.

It is the further objective of this discovery to exploit the multipurpose advantages of boron oxide throughout all phase transformations of the resin blend from initial condensation polymerization to cured, pyrolyzed and ceramitized composite articles. Where boron oxide initially is used for dehydrating the silanol-silanol condensation reactions. The boron nitride also serves as a source (Reference 3) for boron oxide when it forms a stable oxidation protective boron oxide film at approximately 500±50° C. which is stable at red heat (600 to 1000° C.) until the vapor pressure of boron oxide becomes appreciable (Reference 4) above 1200° C. The rate controlling step is at most temperatures, the diffusion of oxygen through the boric oxide surface film (Reference 4). The hot surface is "self extinguishing" when heat is removed—a significant advantage in preventing combustion engine chamber preignition. Boron oxide is also used in combination with alumina which is a more effective catalyst on a weight basis and silica which inhibits both catalysts allowing them to be used in greater quantities than would otherwise be possible.

It is the further objective of this discovery to design and prepare flexible and resilient composite materials which will perform at 500° C. temperatures, i.e., 200° C. higher than those encountered (Reference 5) in the past while still retaining low temperature elastic sealing advantages. These materials are at the same time "preceramic" capable of producing high yield ceramics upon being pyrolyzed to 1000° C.

It is the further objective of this discovery to design and prepare "flexible ceramic" composite laminates from the above elastic composite structures, where "flexible ceramics" are flexible elastic composite structures heat processed in localized regions of the structure to create part ceramic and part flexible elastic "hybrid" composite structures.

This same approach is also achieved in reverse by vacuum filling the less elastic high temperature porous elastic composites (see FIG. 1) with the elastic resin blend then heat curing the resin to 150° C. to assure the formation of a highly elastic resin within the less elastic matrix producing a set of hybrid elastic matrices composites capable (as revealed in FIG. 1) of making elastic composites with highly durable % recovery of the higher heat cured porous composites.

It is the further objective of this discovery to produce essentially nontoxic, solventless resin blends from silicone condensation polymerization carried out at ambient temperature in equipment designed to allow the polymerization to start in excess acetone (sufficient to dissolve the flake resin) while continuously co-mingling the solid additives (boron nitride, silica and boron oxide) within the polymerizing resin reaction mass, thereby producing a thermally stable elastic resin blend for producing high temperature cured elastic composites.

It is the further objective of this discovery to provide a practical method of utilizing the cured polymer porosity (see FIG. 3) for providing a secondary sealant application as the composite silicone polymer material is compressed up to 15% of its thickness releasing the sealant as required at the sealing surface. The method discovered for filling the porosity in one operation is a thermal quench reducing the porosity from up to 12% to less than 1% in one operation.

It is the further objective of this discovery to provide a matrix resin densification method (see FIG. 4) for filling the porosity produced when the organic material the polysiloxane resins is pyrolyzed away at temperatures greater than 300° C. High temperature cured composites will typically have porosity from 10 to 20% when pyrolyzed from 300 to 1000° C. which provides an opportunity to form hybrid elastic matrices and produce elastic composites such as shown in FIG. 1 with high elastic capability depending on the desired final composite required performance temperature.

It is the further objective of this discovery to provide elastic composites with different ceramic sealed edges by selecting different composite reinforcements for laser cutting fabrication of the preferred ceramic edge.

It is the further objective of this discovery to enable the fabrication of composite polysiloxane flexible ceramic gaskets that can complete up to 325,000 miles endurance testing (150,000 mile requirement) in cab fleets (all testing undertaken under confidentiality agreement).

It is the objective of this discovery to enable the fabrication of discontinuous chopped fiber filled high temperature (up to 500° C.) "liquid" gaskets that can perform up to 6,640 hours (testing undertaken under confidentiality agreement) on 460 V8 truck engine dynamometer testing. Similarly, helical overlapping "O" rings as shown in FIG. 5 can be made.

It is the further objective of this discovery to enable IC engine ignition devices to be prepared as flexible ceramic structures embedded with electric circuits that enable multiple spark ignition combustion per chamber with up to 33% fuel savings (testing under confidentiality agreement).

This invention extends the elastic range of silicone composite materials from the typically −40 to 300° C. to temperatures within the "red heat", i.e., up to 600 to 1000° C. range of applications. The polymer matrix composite comprises a matrix of cured high, intermediate and optionally low molecular weight silicone resins including boron nitride and silica additives and reinforcing material. When the resin blend is combined with reinforcement to make composites and heat cured from 200 to 1000° C. the % recovery from 15% compression fatigue (ASTM-F-36 Rev. 95) cycle testing for 10,000,000 cycles, drops off with increasing cure temperature above 500° C. Conversely, these same porous composites (heat cured up to 750° C.) when "densification" processed with the resin blend; unexpectedly endure the same 10,000,000 fatigue cycles with greater than 95% recovery (see FIG. 1). The composites have endured over 4 years internal combustion (IC) engine pressurized severe exhaust manifold temperatures without seal leakage or burn through from exhaust gas at sustained and spike temperatures approaching 1000° C. The composites have passed FAA fire penetration, burn through, heat release (<10 kW/m$^2$), smoke density and Boeing toxicity testing per BSS 7239.

Boron oxide is a multipurpose additive. The boron oxide dehydrates the silanol-silanol condensation reaction to produce elastic polymers with high thermal properties, while simultaneously, the boron nitride part of the additive reaction mixture combined with silica, enables the formation of a superior flexible elastic matrix within the reinforced polysiloxane composites which is not possible with silica alone or boron nitride alone up to 1000° C. (see FIG. 2). From 300 to 1000 C the burn off of the organic matter of the precursor silicone resins affords the opportunity to create new elastic composites with hybrid elastic matrices made by densification processing the 10 to 20% porosity of the high temperature cured composites with the resin blend as shown in FIG. 4.

When the composites are heat treated in localized regions of their structures, the heated regions become high yield (>90%) ceramic while the nonheated areas remain flexible. The pyrolyzed preceramic and ceramic regions' porosity has been filled in a rapid thermal quench with the high temperature elastic matrix impregnant and cured to the desired elastic's performance temperature. Alternatively, laser cut ceramic or refractory fiber reinforced elastic laminates produce flexible composites with ceramic sealed edges, called Flexible Ceramics™. Varying the ceramic fibers produces different ceramic sealed edges.

The multifunctional catalyst used throughout is boron oxide which can be supplied as a residual constituent of commercial reaction produced boron nitride. This approach provides a significant cost savings in eliminating the costly leaching operations needed to remove the boron oxide.

The resin blend's processing capabilities include ambient temperature solventless prepreg processing, heat barrier material enabling multiplaten press "book stack" laminated parts to be laser cut in multiple stacks in one multiple part cost advantaged operation, thermal quench impregnating, laser cutting formation of ceramic sealed laminate edges, and resin infusion mold processing of large structures, silk screening multiple parts with raised coatings and identification marking.

Additionally, the resin blend's products include "O" rings, micro-rod filled sealants that can be "pyroformed" into high-temperature viscoelastic engineering gaskets, adhesives, surface and subsurface wear protective coatings, oxidation protective coatings, porosity stored compliant coatings, pressure activated fastener thread high temperature adhesives, Pyrex™ glass adhesives, high temperature computer boards and fasteners, electrical and heat insulators, and affordable up to 33% fuel saving devices.

Many prototype parts have been made which demonstrate (under confidentiality agreement testing) that most engine components of diesel, internal combustion (IC) and turbine engines that operate up to 1000° C. can be made into fiber reinforced superior high temperature elastic composites made with the resin blend. Examples include engine blocks, cylinder heads, engine gaskets, push rods, valves, pistons, brakes, multiple ignition fuel saving devices, turbine engine combustion liners, compression blades, diesel engine head and exhaust gaskets and rocket motors, fire walls, and high-temperature viscoelastic exhaust manifold, pipe, catalytic converter gaskets and sealants.

DESCRIPTION OF THE PREFERRED EMBODIMENTS

Figure 1:
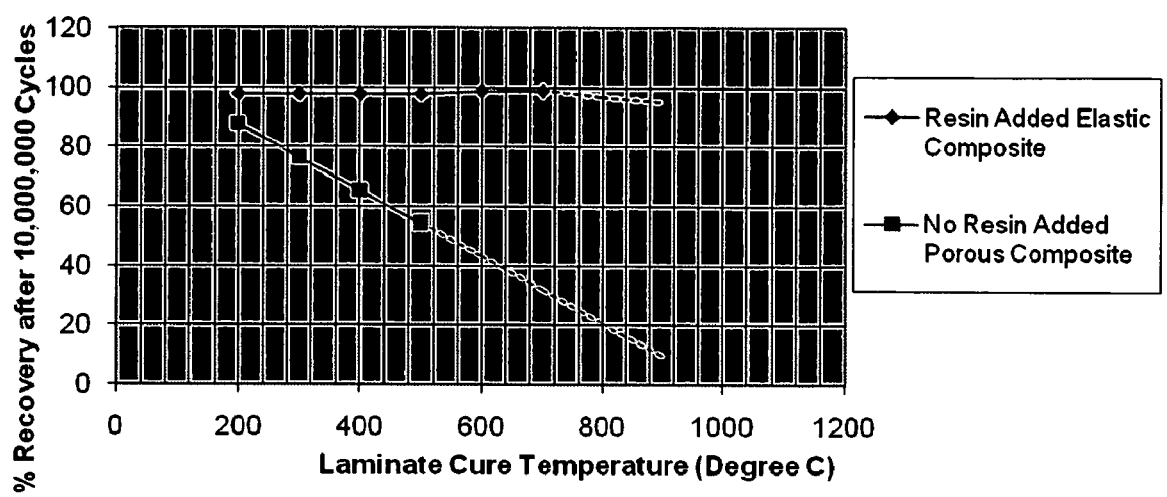
FIG. 1 is a graph of laminate thickness recovery as a function of cure temperature.
Figure 2:
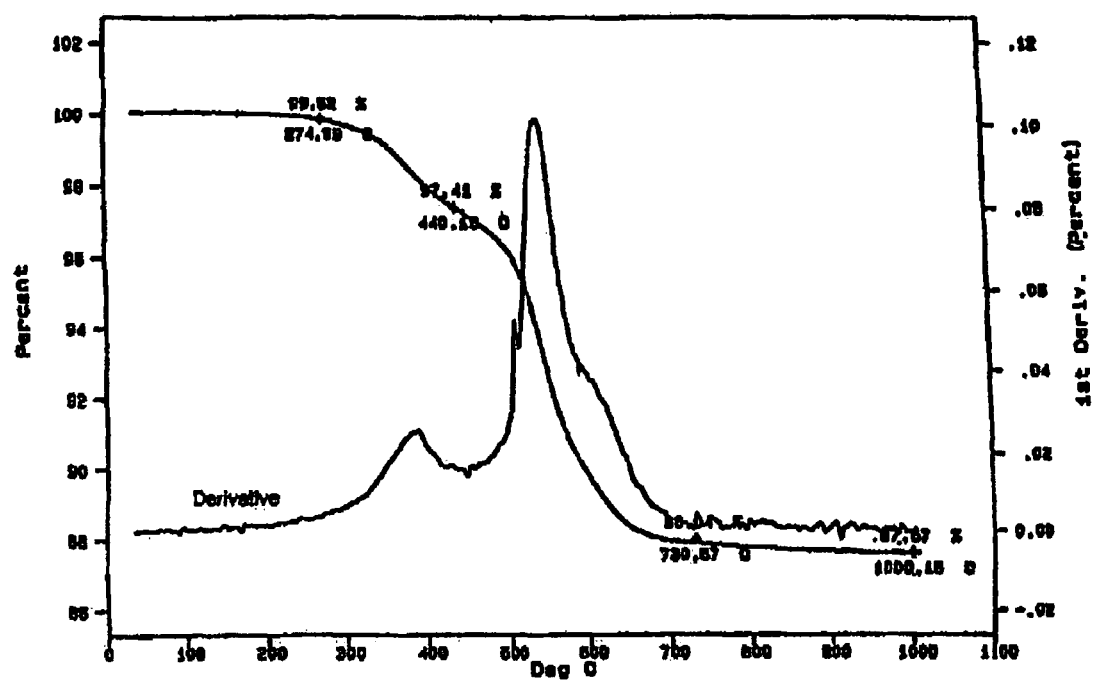
FIG. 2 is a thermogravimetric scan of glass fiber filled polysiloxane laminate.

Durability testing (under confidentiality agreement) of "flexible ceramic" internal combustion engine exhaust manifold gaskets has revealed that they can perform up to and exceeding 350,000 miles cab fleet durability testing (typical automotive requirement is 150,000 miles) with "spike" temperatures up to 500° C. (932° F.). FIG. 1 shows the percent compression recovery is approximately 87% at 200° C. and 63% at 400° C. which is the exhaust gasket's clamping surface performance temperature.

To accomplish the above product performance, the resin blend additive materials are selected with high flexible and thermal resistant properties. The unique resin blend is typically mixed from three silicone resins and two or more ceramic additives. To accomplish the elastic compression recovery performance (see FIG. 1) of composites made from the resin blend's "prepreg" several different composite elements are utilized, the most important being the resin blend composition and methods of processing. The resin blend is formulated from a high-molecular-weight "flake resin" and intermediate liquid silicone resin precursor and optionally a lower molecular weight silicone resin. These resins are selected to have different functionality such as listed in Table 2.

TABLE 2

(Reference 6)
Organosilicon preferred functionalities (where R = methyl or phenyl):

$(RSiO_{3/2})_n$, silsesquioxane polymers, e.g., methylphenylsesquisiloxane
$R_2Si$—OH, silanol (hydroxyl) terminated, polydimethylsiloxane, e.g.,
$HOSiMe_2O$—$(SiMe_2O)n$—$SiMe_2OH$, and

TABLE 2-continued (Reference 6)
Organosilicon preferred functionalities (where R = methyl or phenyl):

$Me_3SiO$—, trimethylsilyl terminated, e.g., $Me_3SiO$—$(SiMe_2O)_n$—$SiMe_3$,
or Dimethylpolysiloxane polymers containing methyl or phenyl
silsesquioxanes, with optional methoxy-termination, e.g.,
$CH_3O$—$(SiMe_2O)_n$—

A variety of polysiloxane oligomers are well known in the art that exhibit similar functionality; however, the discovery's most preferred organic groups are the methyl or phenyl because of their high thermal stability.

A typical resin blend with the preferred additive systems is given in Table 3.

TABLE 3

Typical Resin Blend

| Resin Blend Formulation | Parts by Weight | |
|---|---|---|
| | In General | Preferred |
| (1) Dimethylsiloxane polymers containing phenyl silsesquioxanes | 40-70 | 65 |
| (2) Dimethylsiloxane polymers containing methyl silsesequioxanes. | 5-25 | 10 |
| (3) silanol terminated, poly-dimethylsiloxane | 5-25 | 25 |
| (4) boron nitride & residual boron oxide | 5-40 | 20 |
| (5) boron oxide content of (4) | 0.1-1.2 | 0.40 |
| (6) silica | 3-15 | 6 |
| or other filler such as | | |
| silica gel or | 3-15 | |
| silicon carbide or | 15-25 | |
| alumina or silica fiber reinforced polysiloxane rods | 15-25 | |

In Table 4, the formulation using preferred commercially available resins is set forth.

TABLE 4

Preferred Commercially Available Resins

| Formulations Using Commercial Resins | Parts by Weight | | | |
|---|---|---|---|---|
| | GE Silicones | | Dow Corning | |
| | In General | Preferred | In General | Preferred |
| (1) Dimethyl polymers w/phenyl silsesquioxanes, high MW | 40-70 | 65 (SR 355) | 40-70 | 65 (233) (or 249) |
| (2) Dimethyl polymers w/methyl silsesquioxanes, methoxy terminated | 5-25 | 10 (TPR-179) | 10-60 | 35 (3037) covers items (2) and (3) |
| (3) Silanol terminated Polymethylsiloxane | 5-25 | 25 (TPR-178) | | |

Additives

The preferred resin blend additives are silica and boron nitride retaining 2±1.0 wt % residual boron oxide. These additives provide high thermal capabilities.

Silica/Boron Nitride:

Silica was discovered by Clarke (Reference 2) to slow down the time it takes for the silicone resin reaction mass catalyzed by boron oxide to reach "gel" at 177° C. (Table!). Using this capability, the silicone reaction mass is slowly polymerized at ambient temperature in excess acetone favoring the formation of high molecular weight silicone polymers with high elastic increased linear chain (Si—O—Si) growth. Additionally, a mixture of silica and boron nitride added to the silicone resin reaction mass produces a superior flexible elastic polymer with high-temperature elastic properties than can not be produced using silica or boron nitride alone.

Silica alone will increase the polymer modulus causing it to become nonelastic above 300° C. Boron nitride alone at the suggested 16 wt % will produce an excessively plasticized soft low modulus weak polymer that will fail in interlaminar shear loading as a gasket. But when boron nitride and silica are in a 10/6 to 20/6 parts by weight ratio with 100 parts resin blend (Table 5) the elastic polymer produced by the boron oxide processing will become a thermally stable high-temperature flexible elastic polymer up to 500° C. because the silica is increasing the modulus to compensate for the plasticizing effect of the boron nitride which is thermally stable as a lubricant to 850° C. (Reference 4).

Boron Nitride and Residual Boron Oxide

Boron nitride retaining 2.0+1.0 wt.% boron oxide is available from the Momentive Performance Materials (grade SAM-140) and ZYP Coating (grade ZPG-18 and -19) Companies who can selectively provide this preferred residual boron oxide and within the boron nitride from their commercial synthesis and leaching production operations. This aggregate boron nitride retaining 2% residual boron oxide is superior to high purity boron nitride (requiring a separate catalyst addition) in processing efficiency and cost advantage.

The residual boron nitride containing the residual boron oxide is typically added up to 20 parts by weight for every 100 parts resin as shown in Table 3. The submicron boron nitride containing residual boron oxide is then about 16 wt. % of the resin blend and silica is added at 4.8 wt. %.

Boron nitride is subject to hydrolysis which is negligible (Reference 7) from ambient to less than 100° C., but when the temperature exceeds 100° C.; particularly in autoclave processing, the hydrolysis of boron nitride readily produces noxious ammonia which was observed by the inventor.

The hydrolysis of boron nitride is controlled by the following processing procedures:
(1) The boron nitride containing the residual boron oxide is purchased free of moisture or ammonia and sealed in containers with appropriate desiccant, typically $CaCl_2$.
(2) The polymer reaction is staged under vacuum soak, so the press heat is restricted to less than the boiling point of water until the evolution of water is negligible, then the temperature is allowed to rise to 150° C. where full pressure is applied.

Additionally, silica and boron nitride have been observed to unobviously heat stabilize the elastic phase of the resin blend when used in formulations such as shown in Table 5.

TABLE 5

Heat Evaluation of Elastic Resin Blend Formulations

| Parts by Wt. Resin Blend Components | Accumulated 1 Hour Soak Temperatures | Parts by Weight Additive Formulations | | |
|---|---|---|---|---|
| | | $10BN/6SiO_2/0.25B_2O_3$ | $20BN/6SiO_2/0.4B_2O_3$ | $6SiO_2/0.5B_2O_3$ |
| 100 TPR 179 | @185° C. (365° F.) | Viscous liquid | Viscous liquid | ½ Liquid ½ Solid |
| | @260° C. (500° F.) | Viscous liquid | Gelatinous | Non rubber solid |
| | @330° C. (625° F.) | Elastic recovery (See FIG. 1) | Elastic recovery (See FIG. 1) | Eliminated |
| | @400° C. (750° F.) | Solid rubber w/ compression recovery | Solid rubber w/ compression recovery | Eliminated |
| 100 TPR 178 | @185° C. (365° F.) | Viscous liquid | Viscous liquid | Brittle foam elastic recovery |
| | @260° C. (500° F.) | Elastic recovery Rubber | Brittle foam elastic recovery | Non rubber solid |
| | @330° C. (625° F.) | Foaming solid rubber | Brittle foam | Eliminated |
| 100 Parts 2:1 Ratio 178:179 | @185° C. (365° F.) | Elastic recovery Rubber | Rubber agglomerates | Brittle foam rubber |
| | @260° C. (500° F.) | Brittle foam rubber | Completely solid | Eliminated non rubber |

Unique Blending Method, Mixing with Acetone then Stripping the Acetone

A unique method of mixing the resin formulation has been discovered. The method incorporates the least amount of anhydrous acetone necessary to dissolve the flake resin which is typically 25 parts added to the preferred formulation shown in Table 4. The method uses additive co-mingling and acetone stripping equipment (capable of recovering the acetone) combined together to assure the initial polymerization of the resin precursors incorporates the solid submicron additives uniformly throughout as the resin blend is slowly produced at ambient temperature.

This specialized equipment assures that the boron oxide catalyst contained in the boron nitride particulate can uniformly activate the dehydration of the Si—OH groups to form long chain siloxane bonds, Si—O—Si as the acetone is stripped away. In this process, dehydration probably takes place between the Si—OH groups on the silanol-terminated polysiloxane and residual Si—OH groups on the silsequioxane polymer, leading to polycondensation and the formation of an interpenetrating network. The acetone at 16% of the mixture is removed during the mixing down to approximately 1%.

During the resin blend mixing and stripping of acetone, it is checked for the "gel" reaction time which generally ranges from 2 to 10 minutes at 177° C. Adjustments can be made by adding boron oxide or silica as required, generally this is not necessary.

Prepreg

It is common practice in the art to calculate the values given in Tables 7a and 7b before setting up an impregnation production run to assure the prepreg produced will have the necessary composition needed to mold the final parts accurately to the desired molded finish laminate thickness. Excel spread sheets are commonly used for producing the Table 8 calculations revealing the range of laminate properties. Tables 7a and 7b provide examples of the calculated prepreg and molded laminate properties for two different fiber glass and ceramic fabrics common to the automotive and aerospace industries.

Tables 7a and 7b accurately predict the fabric reinforced polysiloxane composite cure ply thicknesses, $t_L$, calculated for S-glass 6781 and E-glass 1583 reinforcement of the resin blend's polysiloxane cured laminates. These tables also predict the cured laminate cure ply thickness, $t_L$, at different levels of reinforcement composition as well as the required prepreg composition and weight, $W_p$, necessary to produce each laminate thickness.

The entire impregnation is carried out cost effectively at ambient temperature not requiring solvents or heat. Standard metering blade "over-roll" or high speed "reverse roll" impregnating equipment are used to impregnate the fabric. The fabrics can be any of the glass (E-glass, S-glass, quartz or chemically altered variations of these), Nextel® or refractory (e.g., zirconia) high temperature fibers or advanced composite graphite or pitch fiber weaves or styles provided by the textile industry. When using graphite or pitch fabrics, electroless metal (such as nickel or aluminum) coated fibers are preferred for producing these advance composite polysiloxane matrix composites with high performance mechanical properties. Nickel oxide activates the silicone resin blends just as aluminum oxide assuring increased bond strength.

TABLE 7a

Laminate and Prepreg Material Composition of S-Glass, 6781 8HS Fabric Reinforced Polysiloxane Composites

| Fabric and Filler Properties | | Resin Properties | | |
|---|---|---|---|---|
| Properties | Data | Resin Blend | Parts by Weight | Density (g/cm³) |
| Fabric Areal Weight (g/m²) | 300.07 | SR 355 | 65 | 1 |
| Fiber Density (g/cm³) | 2.48 | TPR 178 | 25 | 0.98 |
| Cured Resin & Filler Density (g/cm³) | 1.33 | TPR 179 | 10 | 0.95 |
| Fabric Thickness inches (mm) | 0.0090 (0.229) | BN | 20 | 2.25 |
| Laminate Porosity | 1% | $SiO_2$ | 6 | 2.4 |

| Laminate Properties | | | | Prepreg Properties | | |
|---|---|---|---|---|---|---|
| $t_L$ Inches (mm) | $V_F$ % | $V_{R+f}$ % | $V_{F+f}$ % | $W_F$ % | $W_{R+f}$ % | $W_p$ gm |
| 0.0080 (0.203) | 59.55 | 39.45 | 64.64 | 74.11 | 25.89 | 4.18 |
| 0.0085 (0.216) | 56.04 | 42.96 | 61.58 | 71.23 | 28.77 | 4.35 |
| 0.0090 (0.229) | 52.93 | 46.07 | 58.87 | 68.58 | 31.42 | 4.52 |
| 0.0095 (0.241) | 50.14 | 48.86 | 56.44 | 66.12 | 33.88 | 4.68 |
| 0.0100 (0.254) | 47.64 | 51.36 | 54.27 | 63.85 | 36.15 | 4.85 |
| 0.0105 (0.267) | 45.37 | 53.63 | 52.29 | 61.72 | 38.28 | 5.01 |
| 0.0011 (0.279) | 43.31 | 55.69 | 50.49 | 59.74 | 40.26 | 5.18 |
| 0.0115 (0.292) | 41.42 | 57.58 | 48.85 | 57.87 | 42.13 | 5.35 |
| 0.0120 (0.305) | 39.70 | 59.30 | 47.35 | 56.14 | 43.86 | 5.52 |

Nomenclature
$t_L$ Cure Ply Thickness
$V_F$ Fiber Volume
$V_{F+f}$ Fiber + Filler Volume
$V_{R+f}$ Resin + Filler Volume
$W_F$ Fiber Weight
$W_{R+f}$ Resin + Filler Weight
$W_p$ Prepreg Fabric Weight of 4" × 4" = 16 in² (103.23 cm²) Test Sample TABLE 7b Laminate and Prepreg Material Composition of E-Glass, 1583 8 HS Fabric Reinforced Polysiloxane Composites

| Fabric and Filler Properties | | Resin Properties | | |
|---|---|---|---|---|
| Properties | Data | Resin Blend | Parts by Weight | Density (g/cm³) |
| Fabric Areal Wt. (g/m²) | 560.80 | Dow Corning 249 | 35 | 1.07 |
| Fiber Density (g/cm³) | 2.585 | Dow Corning 233 | 30 | 1.32 |
| Resin & Filler Density (g/cm³) | 1.27 | Dow Corning 3037 | 25 | 1.07 |
| Fabric Thickness inches(mm) | 0.0179 (0.455) | Dow Corning MR2404 | 10 | 1.11 |
| Laminate Porosity | 1% | BN | 20 | 2.25 |
| | | $SiO_2$ | 6 | 2.4 |

| Laminate Properties | | | | Density of Prepreg Resin and Additives | | |
|---|---|---|---|---|---|---|
| $t_L$ In. (mm) | $V_F$ % | $V_{R+f}$ % | $V_{F+f}$ % | $W_F$ % | $W_{R+f}$ % | $W_p$ gm |
| 0.0140 (0.356) | 61.00 | 38.0 | 66.36 | 76.86 | 23.14 | 7.53 |
| 0.0145 (0.368) | 58.90 | 40.10 | 64.51 | 75.25 | 24.75 | 7.69 |
| 0.0150 (0.381) | 56.93 | 42.07 | 62.76 | 73.7 | 26.3 | 7.85 |
| 0.0155 (0.394) | 55.10 | 43.90 | 61.14 | 72.2 | 27.8 | 8.02 |
| 0.0160 (0.406) | 55.38 | 45.62 | 59.62 | 70.8 | 29.2 | 8.18 |
| 0.0165 (0.419) | 51.76 | 47.24 | 58.19 | 69.4 | 30.6 | 8.34 |
| 0.0170 (0.432) | 50.24 | 48.76 | 56.84 | 68.2 | 31.9 | 8.49 |
| 0.0175 (0.445) | 48.80 | 50.20 | 55.56 | 66.9 | 33.1 | 8.65 |
| 0.0180 (0.457) | 47.44 | 51.56 | 54.36 | 65.7 | 34.3 | 8.81 |

TABLE 7b-continued

Laminate and Prepreg Material Composition of E-Glass, 1583 8 HS Fabric Reinforced Polysiloxane Composites

| 0.0185 (0.470) | 46.16 | 52.84 | 53.23 | 64.5 | 35.5 | 8.98 |
| 0.0190 (0.483) | 44.95 | 54.05 | 52.16 | 63.4 | 36.6 | 9.13 |

For Nomenclature, please see Table 7a.

TABLE 8

Volume and Mass Calculations Forecasting Table 8 Press Cured Laminate Properties from Prepreg Formulations Nomenclature

| $t_F$ | Cure ply thickness of fabric | $W_R$ | Weight of resin |
| $t_L$ | Cure ply thickness of laminate | $W_f$ | Weight of filler |
| $A_W$ | Areal weight of fabric | $W_{BN}$ | Weight of boron nitride |
| $A_F$ | Area of fabric | $W_{SiO2}$ | Weight of silicon dioxide |
| $A_L$ | Area of laminate | $W_L$ | Weight of laminate |
| $A_p$ | Area of prepreg | $W_F$ | Weight of fiber |
| $V_F$ | Volume of fibers | $W_p$ | Weight of prepreg |
| $V_{R+f}$ | Volume of resin + filler | $W_{F+f}$ | Weight of fiber + filler |
| $V_f$ | Volume of filler | $\rho_{BN}$ | Density of boron nitride |
| $V_o$ | Volume of voids | $\rho_{SiO2}$ | Density of silicon dioxide |
| $V_L$ | Volume of laminate | $\rho_{R+f}$ | Density of resin + filler |
| $V_{F+f}$ | Volume of fiber + filler | $\rho_F$ | Density of fiber |

Procedure and Calculations:

(1) $t_F = A_w/\rho_F$
(2) $V_F\% = (t_F/t_L) \cdot 100\%$, where $V_L\% = 100\%$ for $V_F = (t_F/t_L) \cdot V_L$ from $A_F = A_L$ (premise)
(3) $V_{R+f}\% = (V_L - V_F - V_o) \cdot 100\%$, where $V_L\% = 100\%$ and $V_o\% = 1\%$
(4) $V_{F+f}\% = [(V_F + V_f)/V_L] \cdot 100\%$, where
$V_{R+f} = (W_R + W_f)/\rho_{R+f}$ then
$V_L = V_{R+f}/(V_{R+f}\%/100\%)$,
$V_F = V_L - V_{R+f}$ and
$V_f = W_{BN}/\rho_{BN} + W_{SiO2}/\rho_{SiO2}$
(5) $W_f\% = (W_f/W_L) \cdot 100\%$, where $W_F = V_F \cdot \rho_F$ and $W_L = W_F + W_f + W_R$
(6) $W_{F+f}\% = [(W_F + W_f)/W_L)] \cdot 100\%$, where $W_f = W_{BN} + W_{SiO2}$
(7) $W_p = W_F/(W_F\%/100\%)$, where $W_F = A_w \cdot A_p$ Nylon Fabric Thermo-Vaporization Heat Barrier for Multiple Stack Laser Cutting The prepreg is processed into stacks of laminates (called "books") separated by unobvious layers of nylon fabric (e.g., style P2220 made by Cramer Fabrics, Inc.) peel ply which the inventor discovered through extensive laser testing will provide a thermo-barrier for multiple stack laser cutting. This allows multiple parts to be cut in one laser cutting operation without thermo-vaporizing the flammable top and edge of each stacked laminate at significant cost advantage.

Lamination Processing of Stacked Fiber Reinforced Polysiloxane Prepreg.

Each ply of each prepreg layer is typically molded in a balanced architecture, e.g., 4-ply laminates for gaskets 1 mm thick are molded with a (0°, +60°, −60°, 90°) balanced architecture (Reference 2), where the warp yarns are arbitrarily selected as the 0° primary reference.

A typical multiple platen stacked laminate press molding cycle consists of an ambient applied preload, followed by a 10 minute vacuum soak, followed by a 30 minute heat cycle to 95° C. which is held until the loss of water from the condensation reaction is negligible, then the heat cycle is continued to 150° C. where full pressure of 200 psi is applied, followed by a 190° C. cure for 2 hours. The laminates are cooled down under pressure to 37° C., and then the platen pressure is reduced to preload, then ambient. After sufficient cooling, the book stacks are removed for multiple part laser cutting.

It has been observed by the inventor that the thickness of the composite laminate is the major cost and performance driver in making such products as automotive or aerospace gaskets. The laminate uniform thickness is the most critical quality control capability requirement for assuring high durability sealing of exhaust manifold gaskets operating at "spike" exhaust gas temperatures of 927° C. Pressure decay testing (Table 9) of laminate gaskets reveals the maximum thickness standard deviation should not be greater than $\pm 0.45 \times 10^{-3}$ inches to assure extended durability. Laminates made to Table 7a composition requirements and molded to the above thickness standard deviation limits have performed well over 4 years in cab fleet testing (under confidentiality agreement) up to 325,000 miles (exceeding 150,000 mile test requirement).

TABLE 9

Decay in Exhaust Gas Pressure from 30 psi (measured in minutes)

| Sample # | Decay in pressure (psi) | Time (minutes) | Average thickness (inches) × $10^{-3}$ | Standard. Deviation × $10^{-3}$ |
|---|---|---|---|---|
| T-1 | 29.4 | 40 | 30.83 | ±0.41 |
| T-2 | 27.2 | 40 | 31.70 | ±0.45 |
| T-3 | 27.0 | 40 | 31.25 | ±0.52 |
| T-4 | 25.0 | 0.83 | 31.50 | ±0.55 |
| T-5 | 25.0 | 1.17 | 31.50 | ±0.78 |

Laser Cutting of Cured Laminate Book Stacks

The laser cutting procedure uses a carbon dioxide laser with nitrogen purge that produces a ceramic sealed cut edge depending upon which ceramic fiber is used for the laminate reinforcement and the laser cut parts have up to 25% higher tensile strength compared to mechanically sheared parts. The following preferred carbon dioxide power settings are used to cut multiple stack laminates with up to 16,500° C. focus point to vaporize the laminate's cut edge. The typical power set up for laser cutting book stacks of multiple laminate is:

| Carbon dioxide production laser cutting set up: | |
|---|---|
| Focal length | 7 inches (17.78 cm) |
| Beam diameter | 0.6 inches (1.52 cm) |
| Laser wavelength | 10.6 micron |
| Focal point diameter | 0.124 inches (0.0315 cm) |
| Laser power | 3500 watt |
| Laser Power/Area | $4.5 \times 10^9$ watt/m² |
| Temperature at focus | 16,785 K (16,510° C.) |

The multiple stack laminate laser cutting is achieved for significant cost advantage by using the following unobvious materials and processes:

(1) A heat barrier nylon fabric is initially placed between laminates molded together in "book stacks" enabling the multiple laminates to be protected from interface thermo-vaporization.
(2) A nitrogen purge is applied to cover the cutting focus point at a 1.5 mm nozzle gap expelling nitrogen gas at 142 psi from a 2 mm nozzle orifice, and
(3) the preferred carbon dioxide power settings (shown above) are used to cut multiple stack laminates with a up to 16,500° C. focus point that vaporizes the laminate stack as it is cut, but not the laminate interface protected by the heat protected nylon fabric separator peel plies.

The power set up enables book stacks of 10 to 20 laminates to be laser cut at a time with higher cutting capacity if needed.

Compression—Recovery Fatigue Testing

When the laminates made from the resin blend are compressed under standard gasket bolt torque requirements they will typically compress 10% of their initial thickness. When surface coatings are added, the compressed thickness will increase to 12 to 15% depending on the type of surface coating. Table 7a reveals for an uncompressed cure ply thickness, $t_L$ of 0.267 mm, a 10% compression to a $t_L$ of 0.241 mm will change the cured laminate reinforcement volume, $V_{F+f}$, from 52% to 56% realizing a higher composite fiber restraining capability for mechanically assisted elastic recovery. The change in volume is primarily due to the collapse of the matrix and surface coating porosity from the applied bolt torque compression causing the matrix thickness change. This compressed reinforcement is responsible for restraining the compression load until the applied load is released.

The following mechanical properties are found for Table 7a laminates cured at 315° C.:

| ASTM-F-36; Procedure A | Pulse Compression Fatigue 40 Hz for 10,000,000 cycles for 315° C. post cure with a load of 5.9 kN to 14.5 kN | Thickness 1.05 mm | Recovery 73.4% | Compression 15.2% |
|---|---|---|---|---|

FIG. 1 reveals the laminate thickness recovery after 15% compression and 10,000,000 compression recovery cycles at different temperatures, e.g., at 200° C. there is 87% recovery and approximately 63% recovery at 400° C. Also, the hotter the steel bolted aluminum clamped laminate joint becomes, the greater the anisotropic thermal expansion sealing pressure exerted by the trapped polysiloxane matrix. In contrast, at the minimum automotive engine design operating temperature of −40° C., the elastic recovery of the matrix prevents cold start blow outs. Deep thermo-shock testing under pressures higher than exhaust manifold pressures is utilized to verify the thermal cycling capability.

Porosity Advantages

Figure 3:
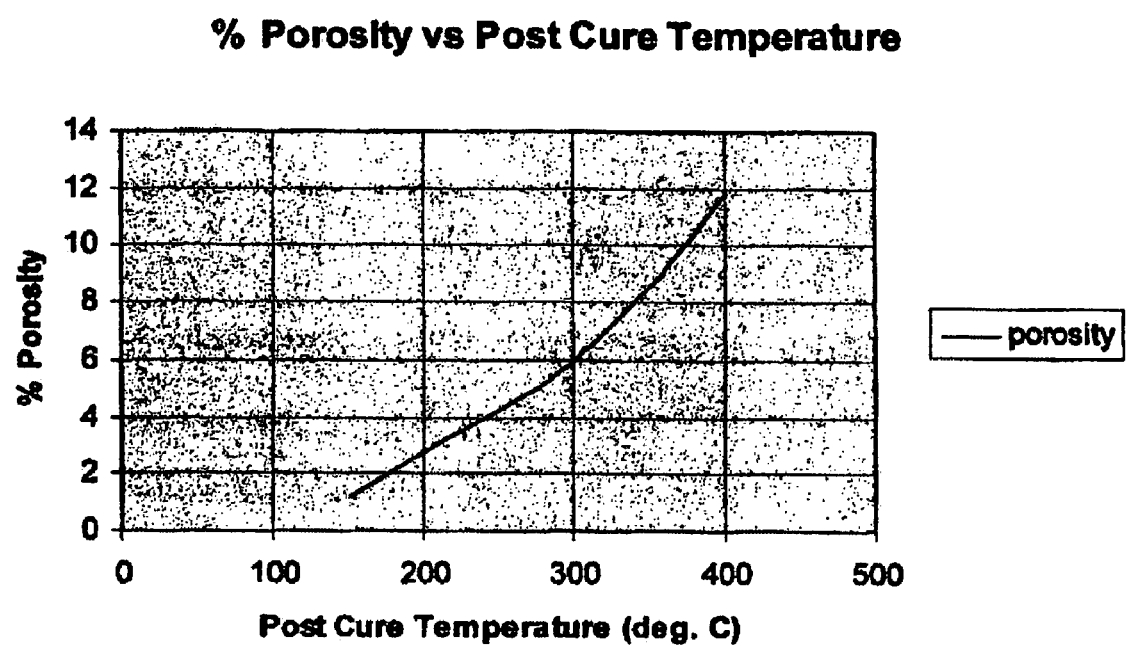
FIG. 3 is graph of percent porosity as a function of post cure temperature.

An important consideration revealed by FIG. 3 and Table 7 is the important role that porosity plays in the performance of the flexible laminates. When the gaskets are initially molded an allowance of 1% porosity provides a fiber volume %, $V_F$%, of 50.2% for a cure ply thickness, $t_L$, of 0.0095 inches. Since there are 4 plies in a standard gasket which is 1 mm or 0.039 inches thick, the desired as compressed thickness is 0.039/4=0.010 inches. Allowing for 10% compression, the initial as molded thickness needs to be 0.039/0.90=0.043 with a $t_L$=0.043/4=0.011 inches.

FIG. 3 reveals the porosity created when the gaskets are cured at different temperatures. When first molded the cure temperature is 177° C. with approximately 1% porosity, but after post cure at 400° C., the porosity is approximately 11%. The fiber+filler volume is approximately constant because the compression at 10% is absorbed by the 11% porosity minimizing lateral displacement of the matrix. Also, the porosity is produced in the cured polymer matrix and surface coatings. Table 7 reveals that the fiber+filler volume %, $V_{F+f}$%, at $t_L$ of 0.011 inches is 54.9%. Table 10 reveals the unobvious discovery of using the porosity to store sealing surface sealant until the laminate is compressed 10% reducing the porosity from 11% to 1%. The porosity also reduces the degree of lateral displacement that would occur in the matrix if the porosity were not free to absorb the compression (see Table 10).

Figure 4:
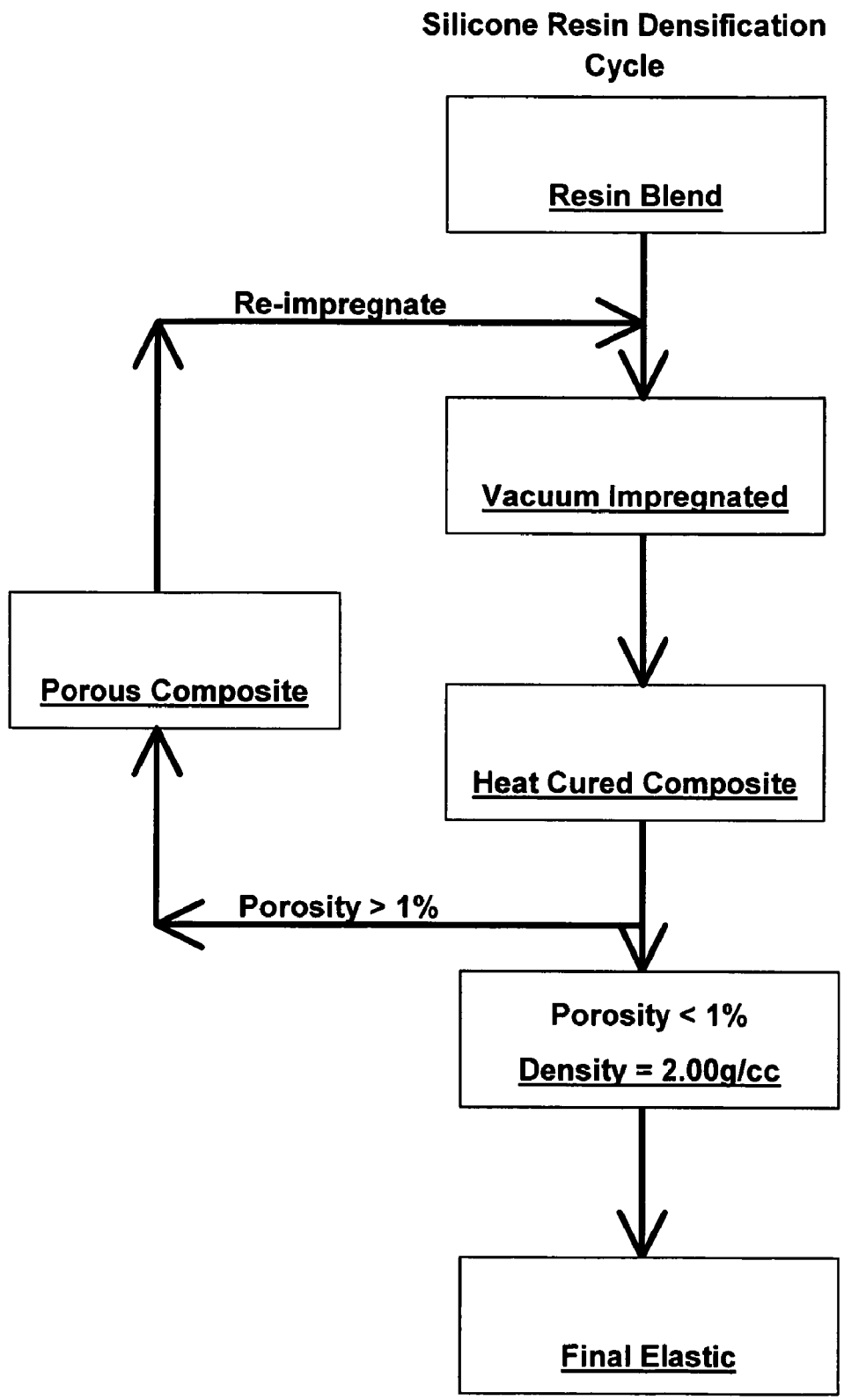
FIG. 4 is a process for a silicone resin densification cycle.

The porosity is filled with the densification resin blend made with Dow Corning 233 flake resin at 65 parts by weight added to 35 parts Dow Corning 3037 intermediate liquid resin to make up the 100 parts resin to which 20 parts boron nitride and 6 parts silica are added and mixed with the 25 parts acetone. FIG. 4 reveals how this deep penetrating resin blend is used for densification.

TABLE 10

Porosity Absorbed Compression

| Comment | Cure Temp. ° C. | $t_L$ (inches) | $V_{F+f}$% | $V_R$% | Porosity, $V_o$% |
|---|---|---|---|---|---|
| as molded | 150 | 0.011 | 54.9 | 44.1 | 1 |
| post cure | 400 | 0.011 | 54.9 | 34.1 | 11* |
| 10% compression | Ambient | 0.010 | 54/.90 = 61 | 38 | 1 |

*The porosity of 11% is filled with resin blend by thermally quenching the hot laminate from 200° C. to ambient in the presence of resin blend in one operation, reducing the porosity to 1%. When the laminate is compressed the resin blend is displaced as clamping surface sealant. See Table 8 for $t_L$, $V_{F+f}$, $V_R$ and $V_o$ Nomenclature.

Thermo-Quench Processing

Additionally, fast thermal quench heat treat processes are used to impregnate pyrolyzed porous polymer or ceramic products, e.g., 12% porosity can be brought to less than 1% in one operation. This same thermal quench process is used to fast impregnate braid and twisted yarn rolls in one operation for producing rod reinforcement for high temperature liquid sealants or "O" ring seals. Essentially all Table 6 resin formulations can be thermal quenched from the last laminate cure temperature. The exception is when using rod filled resins for making "pyroformed" viscoelastic gasket type products.

Prototype Parts

Many prototype parts have been made (under confidentiality agreement) which demonstrate that most engine components of diesel, internal combustion (IC) and turbine engines that operate from 500 to 1000° C. can be made with fiber reinforced composites made with the resin blend. Examples include engine gaskets, push rods, valves, pistons, brakes, multiple ignition fuel saving devices, turbine engine combustion liners, compression blades, diesel engine head and exhaust gaskets and rocket motors, fire walls, and liquid exhaust gaskets and high temperature sealants.

Testing

Testing (under confidentiality agreement) has been extensive on IC engine dynamometers including cab fleet testing and deep thermal shock, steam testing of head gaskets and multispark ignition prototypes. Automotive, coolant, oil and combustion gas sealing has been tested and reviewed with major automotive companies (under confidentiality agreement) including fleet testing. Liquid exhaust gaskets and multiple ignition composite devices are recent developments which solves current costly pollution and fuel burning efficiency automotive IC engine CAFÉ standards capability requirements.

Fire protective testing of the inventions under FAA typical tests has proven the superior performance of the discoveries to pass the FAA major testing requirements for aircraft interior, cargo container, fire blankets and fire wall requirements. The composites have passed FAA fire penetration, burn through, heat release (<10 kW/m$^2$), smoke density and Boeing toxicity testing per BSS 7239.

Figure 5:
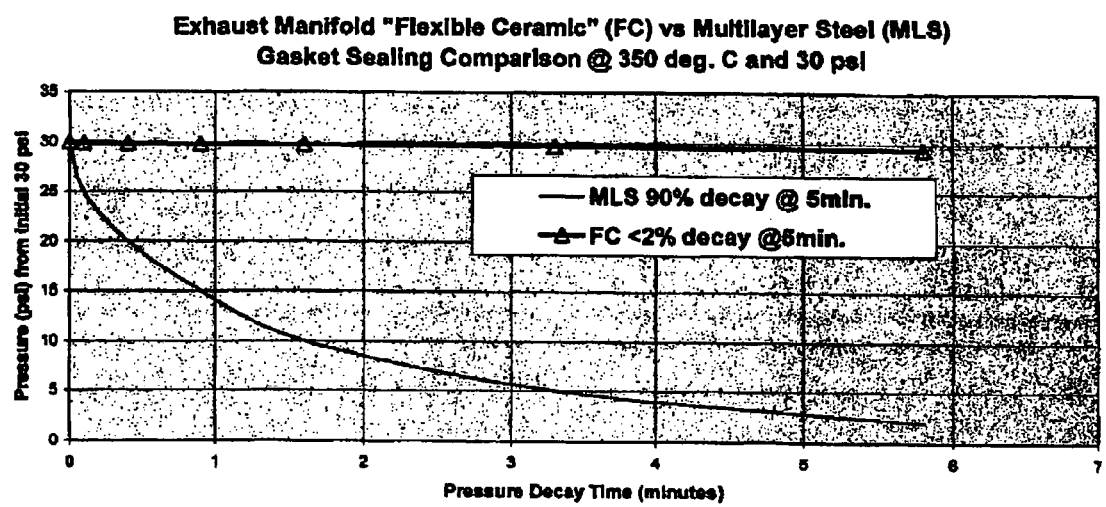
FIG. 5 is a graph illustrating pressure decay curves for flexible ceramic and multilayer steel gaskets.

Ford Crown Victoria 4.6 liter V8 engine FC and MLS exhaust manifold gaskets were comparison tested (under confidentiality agreement) using pressure decay measured from an initial 30 psi applied pressure with the gaskets bolted between aluminum and iron sealing surfaces using standard studs and lock nuts and placed within an oven at 350° C. The pressure decay curves shown in FIG. 5 reveal that FC gaskets had essentially no leakage compared to the MLS gaskets which leaked severely. The FC exhaust gasket matrix material when used as an exhaust manifold sealant was also evaluated for a year (under confidentiality agreement) on Jasper Engine Company Generators powered with Ford 460 V8 truck engines. All engines performed without a problem for 6640 hours which is equivalent to 400,000 miles of truck engine durability. Cab fleet testing has confirmed the durability in performing over 350,000 miles in Crown Victoria 4.6 liter V8 engine exhaust manifold composite gasket testing.

What is claimed is:

1. A resin blend for forming high-temperature elastic composite structures, comprising:
    a silicone resin in about 100 parts by weight;
    boron nitride in about 4 to 40 parts by weight;
    silica in about 3 to 15 parts by weight; and
    boron oxide in about 0.1 to 1.2 parts by weight,
    wherein the resin blend is a flexible elastic polymer with high temperature elastic properties up to at least 500° C.

2. The resin blend of claim 1 wherein the boron oxide is added as part of the boron nitride.

3. The resin blend of claim 1 comprising:
    a silicone resin in about 100 parts by weight;
    boron nitride in about 20 parts by weight;
    silica in about 6 parts by weight; and
    boron oxide about 0.4 parts by weight.

4. The resin blend of claim 1 wherein the silicone resin is a blend selected from a high molecular-weight "flake resin" and an intermediate molecular weight resin.

5. The resin blend of claim 4 wherein the silicone resin is a blend selected from organosilicone precursors selected from silsesquioxane polymers, silanol (hydroxyl) terminated poly-dimethylsiloxane, trimethylsilyl terminated silanol, dimethylpolysiloxane polymers containing methyl silsesquioxanes, dimethylpolysiloxane polymers containing phenyl silsesquioxanes, dimethylpolysiloxane polymers containing methyl silsesquioxanes with methoxy-termination and methylpolysiloxane polymers containing phenyl silsesquioxanes with methoxy-termination.

6. The resin blend of claim 1 wherein the silicone resin is a blend selected from a high molecular weight "flake resin", an intermediate molecular weight resin and a low molecular weight silicone resin precursor.

7. The resin blend of claim 6 wherein the silicone resin is a blend selected from organosilicone precursors selected from silsesquioxane polymers, silanol (hydroxyl) terminated poly-dimethylsiloxane, trimethylsilyl terminated silanol, dimethylpolysiloxane polymers containing methyl silsesquioxanes, dimethylpolysiloxane polymers containing phenyl silsesquioxanes, dimethylpolysiloxane polymers containing methyl silsesquioxanes with methoxy-termination and methylpolysiloxane polymers containing phenyl silsesquioxanes with methoxy-termination.

8. The resin blend of claim 1 wherein the silicone resin is a blend of dimethylsiloxane polymers containing phenyl silsesquioxanes, dimethylsiloxane polymers containing methyl silsesquioxanes and silanol terminated poly-dimethylsiloxane.

9. The resin blend of claim 8 wherein the dimethylsiloxane polymers containing phenyl silsesquioxanes are present in 40 to 70 parts by weight, the dimethylsiloxane polymers containing methyl silsesquioxanes are present in 5 to 25 parts by weight and the silanol terminated poly-dimethylsiloxane is present in 5 to 25 parts by weight.

10. The resin blend of claim 9 wherein the dimethylsiloxane polymers containing phenyl silsesquioxanes are present in about 65 parts by weight, the dimethylsiloxane polymers containing methyl silsesquioxanes are present in 10 parts by weight and the silanol terminated poly-dimethylsiloxane is present in 25 parts by weight.

11. The resin blend of claim 10 wherein
    the boron nitride is present in about 20 parts by weight;
    the silica is present in about 6 parts by weight; and
    the boron oxide is present in about 0.4 parts by weight.

12. A procedure for forming the resin blend of claim 1 wherein the silicone resin is catalyzed by the boron oxide to form a silicone reaction mass that is slowly polymerized at ambient temperature in acetone favoring the formation of high molecular-weight silicone polymers with high elastic linear chain growth and adding a mixture of the silica and the boron nitride to the reaction mass to produce a flexible elastic polymer with high-temperature elastic properties up to at least 500° C.

13. The procedure of claim 12 wherein the boron nitride and silica are in about 10/6 to 20/6 parts by weight ratio with about 100 parts resin blend.

14. The procedure of claim 12 wherein the boron nitride contains about 2% residual boron oxide which is added up to about 20 parts by weight to about 100 parts per weight resin.

15. The procedure of claim 12 wherein the resin blend comprises a high molecular weight "flake resin" that is dissolved by the acetone during mixing.

16. The procedure of claim 15 wherein the acetone is present at about 25 parts by weight and during mixing is reduced to about 1%.

17. A procedure for forming a pre-preg from a resin blend for forming a high temperature elastic composite structure comprising a silione resin in about 100 parts by weight, boron nitride in about 4 to 40 parts by weight, and boron oxide in about 0.1 to 1.2 parts by weight, wherein the resin blend is a flexible elastic polymer with high temperature elastic properties up to at least 500° C., the procedure comprising:
    selecting a fabric;
    impregnating sheets of the fabric with the resin blend;
    stacking the impregnated sheets to form a laminate; pressure-molding the laminate;
    applying heat to the laminate to remove water; and
    curing the laminate to allow the formation of pores within the laminate.

18. The procedure of claim 17 further comprising the step of filling the pores with a densification resin blend comprising components of the resin blend of claim 1.

19. The procedure of claim 18
    wherein the pores in the laminate are filled with the densification resin blend by vacuum impregnation.

20. The procedure of claim 18 wherein the sheets are separated by a heat barrier nylon fabric in forming the laminate.

21. The procedure of claim 18 wherein the densification resin blend comprises a high molecular weight dimethyl polymer with phenyl silsesquioxane at about 40 to about 70 parts by weight, and at about 10 to 60 parts by weight methoxy terminated dimethyl polymer with methoxy terminated silsesquioxane and a silanol terminated polymethyl siloxane, to which about 20 parts by weight boron nitride and about 6 parts by weight silica are added and mixed.

22. The procedure of claim 21 further comprising the silica being mixed with about 25 parts by weight of acetone.

23. The procedure of claim 18 wherein the pores in the laminate are filled with the densification resin blend by thermal quenching.

24. The procedure of claim 23 wherein the thermal quenching comprises quenching the laminate from about 200° C. to about 400° C. to about ambient in the presence of the densification resin blend reducing the porosity of the laminate.

25. The procedure of claim 24 wherein the porosity is reduced to about 1%.

26. The procedure of claim 25 wherein the edges of the laminate are laser cut to produce a ceramic edge and increased tensile strength.

27. The porous composite formed from the procedure of claim 17.

28. A flexible composite formed from a procedure comprising:
   selecting a resin blend comprising a silicone resin in about 100 parts by weight, boron nitride in about 4 to 40 parts by weight, silica in about 3 to 15 parts by weight, and boron oxide in about 0.1 to 1.2 parts by weight wherein the silicone resin is catalyzed by the boron oxide to form a silicone reaction mass that is polymerized to favor the formation of high molecular weight polymers with high elastic linear chain growth and the addition of a mixture of the silica and the boron nitride to the reaction mass produces a flexible elastic polymer with high-temperature elastic properties up to at least 500° C.;
   impregnating sheets of fabric with the resin blend;
   stacking the impregnated sheets to form a laminate;
   pressure-molding the laminate;
   heating the laminate to remove water therefrom;
   curing the laminate to allow the formation of pores within the laminate; and
   filling pores within the laminate with a densification resin blend comprising a high molecular weight dimethyl polymer with phenyl silsesguioxane at about 40 to about 70 parts by weight, and at about 10 to 60 parts by weight methoxy terminated dimethyl polymer with methoxy terminated silsesguioxane and a silanol terminated polymethyl siloxane, to which about 20 parts by weight boron nitride and about 6 parts by weight silica are added and mixed.

29. The flexible ceramic of claim 28 wherein the pressure-molding is by vacuum-soaking the laminate.

30. The flexible composite of claim 28 wherein the cured laminate is thermo-quenched to fill pores within the cured laminate.

31. A flexible composite wherein a plurality of the laminates pursuant to claim 28 are stacked and separated by nylon fabric heat barriers.

32. The flexible composite of claim 31 wherein outer edges of the cured and densification resin blend pore filled and nylon fabric heat barrier separated laminates are laser cut to produce ceramic sealed outer edges.

* * * * *